US008926296B2

(12) United States Patent
Dainez et al.

(10) Patent No.: US 8,926,296 B2
(45) Date of Patent: Jan. 6, 2015

(54) LINEAR MOTOR, A LINEAR COMPRESSOR, A METHOD OF CONTROLLING A LINEAR COMPRESSOR, A COOLING SYSTEM, AND A LINEAR COMPRESSOR CONTROLLING A SYSTEM

(75) Inventors: Paulo Sergio Dainez, Joinville SC (BR); Dietmar Erich Bernhard Lilie, Joinville SC (BR); Márcio Roberto Thiessen, Joinville SC (BR)

(73) Assignee: Whirlpool, S.A., Sao Paulo (BR)

( * ) Notice: Subject to any disclaimer, the term of this patent is extended or adjusted under 35 U.S.C. 154(b) by 246 days.

(21) Appl. No.: 13/267,154

(22) Filed: Oct. 6, 2011

(65) Prior Publication Data
US 2012/0141300 A1 Jun. 7, 2012

Related U.S. Application Data

(62) Division of application No. 10/587,234, filed as application No. PCT/BR2005/000006 on Jan. 19, 2005, now Pat. No. 8,033,795.

(30) Foreign Application Priority Data

Jan. 22, 2004 (BR) ...................................... 0400108

(51) Int. Cl.
F04B 17/04 (2006.01)
F04B 35/04 (2006.01)
H02K 33/16 (2006.01)
H02P 25/06 (2006.01)
F04B 49/06 (2006.01)

(52) U.S. Cl.
CPC ............. *H02K 33/16* (2013.01); *F04B 35/045* (2013.01); *F04B 2201/0201* (2013.01); *H02P 25/06* (2013.01); *F04B 2203/0401* (2013.01); *F04B 49/06* (2013.01); *F04B 2203/0402* (2013.01)
USPC ............ 417/417; 417/416; 318/135; 318/687

(58) Field of Classification Search
CPC ........... F04B 35/045; F04B 2203/0401; F04B 2203/0404; Y10S 417/902; F25B 49/022
USPC ............... 417/44.1, 44.11, 45, 363, 416, 417; 318/135, 687
See application file for complete search history.

(56) References Cited

U.S. PATENT DOCUMENTS 4,345,442 A   8/1982  Dorman
5,156,005 A  10/1992  Redlich
(Continued)

FOREIGN PATENT DOCUMENTS

JP        2003-309994     10/2003
WO        WO 01/54253      7/2001

OTHER PUBLICATIONS

International Search Report mailed May 11, 2005 for International Application No. PCT/BR2005/000006.
(Continued)

*Primary Examiner* — Devon Kramer
*Assistant Examiner* — Patrick Hamo
(74) *Attorney, Agent, or Firm* — Fay Sharpe LLP

(57) ABSTRACT

A linear compressor (100) applicable to a cooling system (20) includes a piston (1) driven by a linear motor (10), the piston (1) having displacement range controlled by means of a controlled voltage ($V_M$), the controlled voltage ($V_M$) having a voltage frequency ($\phi_P$) applied to the linear motor (10) and adjusted by a processing unit (22), the range of piston (1) displacement being dynamically controlled in function of a variable demand of the cooling system (20), the linear compressor (100) having a resonance frequency, the processing unit (22) adjusting the range of piston (1) displacement, so that the linear compressor (100) will be dynamically kept on resonance throughout the variations in demand of the cooling system (20).

4 Claims, 9 Drawing Sheets

(56) References Cited

U.S. PATENT DOCUMENTS

| | | | |
|---|---|---|---|
| 5,342,176 A | | 8/1994 | Redlich |
| 5,646,499 A | * | 7/1997 | Doyama et al. ............... 318/801 |
| 5,980,211 A | * | 11/1999 | Tojo et al. ...................... 417/45 |
| 6,746,211 B2 | * | 6/2004 | Kwon et al. ............... 417/44.11 |
| 6,753,665 B2 | | 6/2004 | Ueda et al. |
| 6,857,858 B2 | | 2/2005 | Jeun |
| 2003/0026702 A1 | | 2/2003 | Yoo et al. |
| 2003/0129063 A1 | | 7/2003 | Jeun |
| 2004/0005222 A1 | | 1/2004 | Yoshida et al. |
| 2004/0071556 A1 | | 4/2004 | Sung et al. |
| 2005/0271526 A1 | | 12/2005 | Chang et al. |

OTHER PUBLICATIONS

Written Opinion of the International Searching Authority mailed May 11, 2005 for International Application No. PCT/BR2005/000006.

International Preliminary Report on Patentability completed Apr. 4, 2006 for International Application No. PCT/BR2005/000006.

\* cited by examiner

LINEAR MOTOR, A LINEAR COMPRESSOR, A METHOD OF CONTROLLING A LINEAR COMPRESSOR, A COOLING SYSTEM, AND A LINEAR COMPRESSOR CONTROLLING A SYSTEM

This application is a divisional of U.S. application Ser. No. 10/587,234 filed Oct. 30, 2006, now U.S. Pat. No. 8,033,795 which is the U.S. National Phase filing of PCT International Application No. PCT/BR2005/000006 having an international filing date of Jan. 19, 2005, which claims priority from Brazilian patent application No PI0400108-7 filed on Jan. 22, 2004, all the disclosures thereof being hereby incorporated herein by reference.

The present invention relates to a linear motor, a linear compressor, a linear compressor controlling method, a cooling system, as well as to a linear compressor controlling system with the purpose of operating a linear compressor in resonance, so that the latter will have the highest efficiency throughout its operation.

BACKGROUND OF THE INVENTION

A resonant linear motor essentially comprises a linear motor, for example, a linear motor coupled to a resonant mechanism, which may comprise a spring, or to a to any load that produces a spring effect, to generate a resonant movement between the linear motor and the load. The applications of this type of linear motor may include driving fluid pumps in general, which can actuate variable loads.

Typical examples of this type of construction are linear motors employed on linear compressors that are often applied to cooling systems, due to its efficiency in terms of economy of electric energy. A linear compressor 100 employed on a cooling system is, as shown in FIG. 1, usually mounted inside a housing (not shown), the gas contained in this housing being under low pressure and being aspirated and compressed by the linear compressor for release in a high-pressure environment 7.

The gas compression mechanism takes place by axial movement of the piston 1 inside a cylinder 2 having a head 3; suction 3a and discharge 3b valves being positioned at the head 3, these valves regulating the entry and exit of gas in and out of the cylinder 2. The piston 1 is driven by a linear motor 10, which is formed by a stator 411 having a coil 11 and a support 4. The stator 411, in turn, actuates a magnet 5 that impels the actuator, in this case the piston 1, the actuator being associated to a helical-type spring 8, forming the resonant assembly of the linear compressor 100.

The resonant assembly, driven by the linear motor 10 that has the function of producing a linear reciprocating movement, causing the movement of the piston 1 inside the cylinder 2 to exert a compression action compressing the gas admitted by the suction valve 3a, to the extent where the latter can be discharged to the high-pressure side through the discharge valve 3b into the tubing 7.

The amplitude of the operation of the linear compressor 100 is regulated with the balance of the power generated by the linear motor 10 and the power consumed by the mechanism in compressing the gas plus other losses.

Another characteristic of the linear mechanism is the possibility of varying its pumping capacity, reducing the power of the electric motor, the operation amplitude in turn reducing the pumping capacity.

A parameter to be varied for controlling the amplitude of the linear compressor may be the feed voltage of the electric motor. From the feed voltage of the electric motor until the desired amplitude is achieved there are various coupled impedances, such as electric resistance of the electric motor, the inductance of the electric motor, capacitance if a capacitor is used, the counter-electromotive force, the impedances of the resonant system (mass/spring) and the compression work with its inherent losses. The impedance of this system depends upon the actuation frequency of the system, that is to say, the frequency of the voltage applied to the electric motor. At a certain frequency the output of this system is optimum, and this occurs when the mechanical system enters into resonance; at this frequency the output of the linear compressor is maximum.

"Gas Staring" Effect

The resonance frequency of the mechanism is not perfectly fixed. When compressed, the gas has a mechanical effect similar to the one of a spring (also known as "gas spring"), this "gas spring" is affected mainly by two factors: the distance between the piston and the valve plate and the pressures that the linear compressor operates.

The distance between the piston and the plate is altered when the piston stroke is reduced, generating an increase of the "gas spring" and in the resonance of the mechanism (this effect is the most relevant to the operation stability of the mechanism). In a cooling system, these two factors alter substantially, the pressures varying from the instant when the system is turned on until it reaches the operation condition, the operation condition is affected by the room temperature and the internal temperature of the cooler, the piston/plate distance is altered when the system needs more or less energy for its operation. In this way, the resonance frequency of the mechanical system varies due to various factors.

Cooling System/Cooler/refrigerators Usable with the Teachings of the Present Invention There are basically two types of cooler: the simple-class coolers and the coolers with embarked electronics. In addition to the application to coolers in general, the teachings of the present invention may be applied to cooling systems in general, for instance, air conditioning systems. In this case, the only conceptual difference lies in the fact that the air conditioning system is applied to a room (or cooled environment), whereas in the case of a cooler or a refrigerator the system is used in a closed cabinet.

Anyway, the coolers or cooling systems with embarked electronics are provided with electronic circuits that have the capacity of analyzing the internal temperature of the cooler and making adjustments in the capacity of the linear compressor so as to operate it in the most effective way possible.

The coolers or cooling systems of this simple class are not provided with embarked electronics, having only one circuit that turns on and off the linear compressor (an "on/off" thermostat) from time to time without, however, being able to act on the capacity thereof.

In spite of operating in an efficient way, the coolers with embarked electronics obviously have a higher cost when compared with the simple-class coolers.

According to the teachings of the present invention, it is possible to provide a linear compressor with electronics capabilities to adjust the respective capacity, following the demand of the cooling system, even in the cases where simple-class cooler are employed. For this purpose, the linear compressor should be capable of analyzing the cooling capacity necessary for the required condition within the environment of a cooler, based on measurements made in the feed voltage and current of the electric motor that drives the linear compressor.

DESCRIPTION OF THE PRIOR ART

One of the ways of achieving an improved efficiency in systems involving linear compressors is to approximate the piston to the respective stroke end as far as possible. Examples of these techniques may be found in documents U.S. Pat. No. 5,156,005 and U.S. Pat. No. 5,342,176. In these two documents, the control over piston range is described. Neither of these techniques, however, foresees control over the amplitude for the linear compressor to operate in resonance, so that, on the basis of the teachings of these documents, the linear compressor may operate with low efficiency depending upon its load conditions.

A prior art which describes a system that monitors the movement of the piston of a linear compressor, is disclosed in document WO 01/54253. According to the teachings of this document, a system and a method applicable to a linear compressor are foreseen, according to which the measurement of a first square wave obtained by integrating the current applied to the electric motor and a second square wave obtained from the voltage applied to the electric motor. On the basis of these measurements, the control over the movement of the piston is carried out by means of a TRIAC, evaluating the difference between the phases of the first square wave and the second square wave. In this way, the piston of the linear compressor operates in a position closer to the valve plate.

This document WO 01/54253 does not approach the problem of unbalance relating to the "gas spring" effect, and one of the objectives of the invention described in this prior art document is to obtain a greater operation stability, and so the system can operate in non-ideal conditions in terms of efficiency.

Moreover, another drawback resulting from the construction proposed in document WO 01/54253 lies in the fact that one monitors the phase by means of square waves. This approach results in that, to obtain the difference between the phases, it is necessary to employ electronic circuits or computer programs that make the integration of the current, that generate the first and the second square waves described therein and that calculate the difference in phase between the first wave and the second square wave. This construction, and the process described therein, however, has a high manufacture cost in addition to less reliability, since it needs circuits for carrying out these conversions, which, due to the large number of components involved, reduces the reliability of the system, since each added electronic component represents a greater probability of failure. The option of implementing a device described in the document by means of a computer program also results in a high cost, since in this case, with the approach used, it will be necessary to have an excessively sophisticated microcontroller and, therefore, higher costs.

Moreover, the application of linear compressors in cooling systems depends on the use of electronic thermostats capable of informing the control, by means of a command signal, about the capacity which the linear compressor should operate. This makes the system complex and does not permit application of the linear compressor in any system.

Another possibility is to actuate the linear compressor in a fixed capacity and to use the conventional thermostat ("On/Off" type). This, however, sub-utilizes the resources available at the control.

OBJECTIVES OF THE INVENTION

The objectives of the present invention are a linear motor, a linear compressor, a method of controlling it, as well as a cooler/refrigerator that has no need of embarked electronics, but at the same time has the capacity of adjusting the capacity according to the demand. In other words, according to the teachings of the present invention, the cooler will see the linear compressor with electronics as if the latter was an ordinary linear compressor, thus maintaining the characteristics of simple-class coolers/refrigerators unchanged and transferring the whole electronic control to the linear compressor.

In addition, it is an objective of the present invention to provide a resonant linear motor that can operate in a controlled way as far as the range of its displacement is concerned, without the need to make use of an external electronic control.

Thus, the intention is:

To adjust the operation capacity of the cooling system by using a linear compressor, without the need for a complex thermostat, permitting the use of the linear compressor in any type of system.

To permit the use of the linear compressor in any system with a conventional thermostat (on/off type), and further permit the adjustment of the operation capacity, thus using the whole potential of the linear compressor.

To optimize the functioning of the linear compressor, to have the system always operate at its maximum efficiency possible.

To operate a resonant linear motor, without the need to use an external circuit controlling its behavior; the latter should operate always in optimum functioning conditions.

SUMMARY OF THE INVENTION

As described above, the resonance frequency of the mechanism varies as a function of the pressures and of the operation amplitude of the liner compressor. Since the pressures are variable and non-controllable (at least directly) at certain moments, the linear compressor may operate out of resonance, which results in loss of performance. On the other hand, the displacement range or piston stroke is a controllable variable, so that according to the present invention it is foreseen to vary/adjust the operation stroke so as to minimize or zero the phase between the current and the piston speed, so as to maintain the mechanism in perfect syntony and consequently with the best performance. Analyzing a cooling system, one can notice that the aspiration pressure of the linear compressor rises when the door of the cooler is opened or a new thermal load is added to the system. In this situation, the strategy of maintaining the phase minimized by varying the operation amplitude causes the linear compressor to increase the stroke, thus meeting the necessity of the system to withdraw the added heat.

It is important to observe that, in spite of making reference to the reading of the phase between the current and the piston speed, one should understand that this phase may be obtained by reading other parameters; for instance, one may replace the piston speed by the piston displacement, which is at 90° with respect to each other, and may use this information to read the phase by using the piston position as a reference, for some constructive convenience of the control circuit. It is also possible to replace the speed by the counter-electromotive force (CEMF) that is in phase, with the objective to measure the phase between the current and the dynamics of the mechanism (for example, the CEMF). Preferably, the mean of current phase and the CEMF phase are used, resulting in the electric-motor phase.

The CEMF may be obtained by the formula $$CEMF = k \times \frac{\partial D_P}{\partial t}$$

wherein k is a constant; $\delta D_P$ is the piston-displacement derivative, and $\delta t$ is the time derivative.

Since the piston movement is approximately sinusoidal it is possible to know when the displacement is maximum, the CEMF is passing by zero. In order to detect this value, it is sufficient to have a proximity sensor, which will indicate a peak of signal when the piston is, for instance, close to its stroke end. Thus, in order to measure the CEMF phase, the point of maximum piston displacement is measured.

With regard to the behavior of the resonance, it is known that, as the range of piston displacement is increased, the resonance frequency of the linear compressor is lowered, while the greater the load demanded by the cooling system the higher the resonance frequency.

This phenomenon occurs because, as the suction pressure increases (demanded by the cooling system at the suction valve of the linear compressor), this means that a thermal load has been put into the cooler. This warmer mass raises the temperature of the internal environment of the cooling system, causing the rise in the evaporation pressure, since the cooling liquid is in a saturated liquid state, and one can conclude that the pressure and the temperature are intrinsically interconnected. Thus, the fact of placing something warmer in the cooler, will result in a rise in pressure, raising the pressure of the gas on the piston, causing the resonance of the mechanism to decrease, which will cause a phase shift in the linear compressor.

In practice, this means that, as the heat inside the cooler rises, the load of the system also rises, causing the resonance frequency of the system to rise, and the piston stroke should be increased, which results in reducing of resonance frequency, since the piston stroke is longer. In this case, that difference by which the resonance frequency has risen as a function of the load added to the system, may cause the system to operate again at the previous frequency (or resonance frequency), increasing the piston displacement, leading the assembly to operate in resonance frequency.

On the other hand, a decrease in the load of the system (frozen food, lowering the ambient temperature) leads to an increase in the system phase, which may render the phase positive and compensate with a decrease in the system capacity until the phase reaches the zero value.

In this way, while the phase shift is positive, one should decrease the cooler capacity, to have the system operating again in resonance and, when the phase shift is negative, the capacity of the linear compressor should be increased, to have the system operating again in resonance.

One of the objectives of the present invention is achieved by means of a linear motor having a displacement range that is controlled by means of the electric voltage controlled by the processing unit, so that the resonant assembly can be dynamically kept in resonance throughout the variations in load.

Further, one of the objectives of the present invention is achieved by means of a linear compressor applicable to a cooling system, the linear compressor comprising a piston driven by an electric motor, the piston having a displacement range controlled by a controlled electric voltage, the controlled electric voltage having a voltage frequency applied to the electric motor and adjusted by a processing unit, the range of piston displacement is dynamically controlled as a function of the variable demand of the cooling system, the linear compressor having a resonance frequency, the processing unit adjusting the range of piston displacement so that the linear compressor will be dynamically kept in resonance throughout the variations in demand of the cooling system.

The objectives of the present invention are also achieved by means of a method of controlling a linear compressor, the linear compressor comprising a piston driven by an electric motor, the piston having a displacement range controlled by a controlled electric voltage, the controlled electric voltage having a voltage frequency applied to the electric motor and adjusted by a processing unit, the method comprising the steps of monitoring the range of piston displacement throughout the operation of the linear compressor, dynamically adjusting the displacement range as a function of a variation in the demand of the linear compressor, so that the linear compressor will be kept in resonance throughout the variations in demand of the cooling system.

Further, the objectives of the present invention are achieved by means of a method of controlling a linear compressor, which comprises steps of measuring a feed phase of the feed current and a dynamic phase of the piston of the linear compressor, and measuring and establishing a measured phase, and dynamically adjusting the displacement range as a function of a variation in the demand of the linear compressor, so that the linear compressor will be kept in resonance throughout the variations in the demand of the cooling system.

The teachings of the present invention are further carried out by means of a cooling system comprising a linear compressor, the cooling system comprising an on/off thermostat actuating the linear compressor, the linear compressor comprising a piston driven by an electric motor, the piston having a displacement range controlled by a controlled electric voltage, the controlled electric voltage having a voltage frequency applied to the electric motor and adjusted by a processing unit, the range of piston displacement being dynamically controlled as a function of a variable demand of the cooling system during the period in which the thermostat turns on the linear compressor, the linear compressor having a resonance frequency, the processing unit adjusting the range of piston displacement, so that the linear compressor will be dynamically dept in resonance throughout the variations in demand of the cooling system.

BRIEF DESCRIPTION OF THE DRAWINGS

The present invention will now be described in greater detail with reference to embodiments represented in the drawings. The figures show.

DETAILED DESCRIPTION OF THE FIGURES

Figure 1:
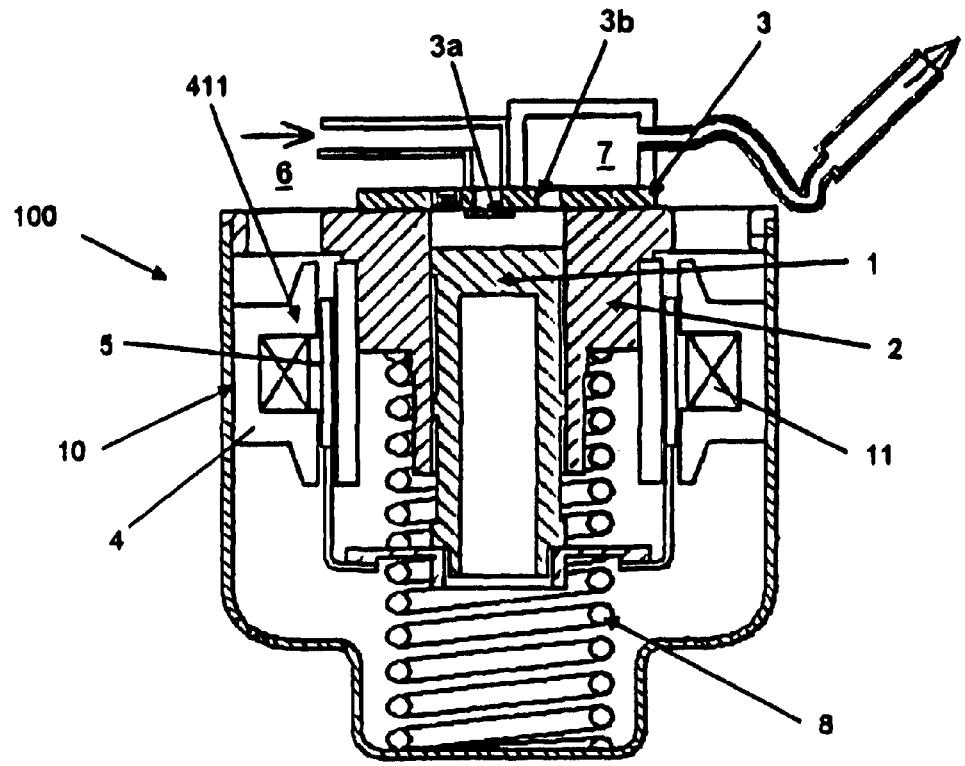
FIG. 1 is a schematic view of a linear compressor.
Figure 2:
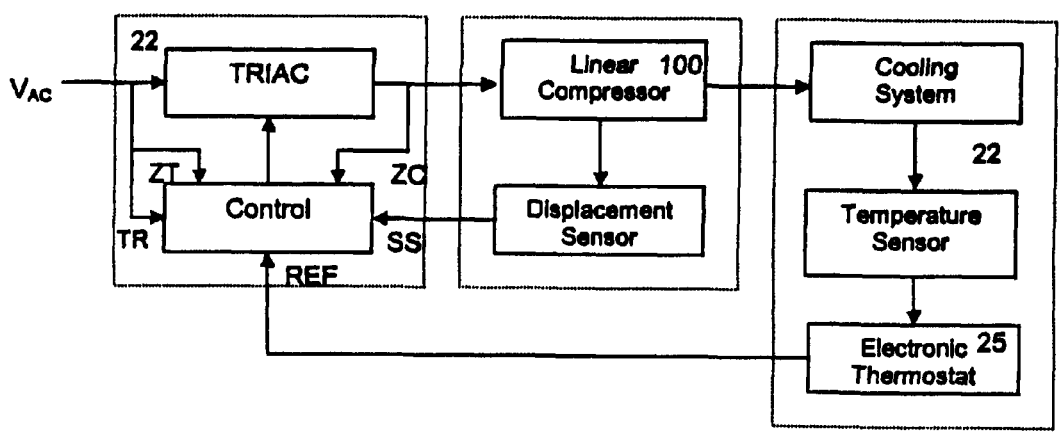
FIG. 2 is a diagram of the control system, of the linear compressor and of the cooling system of the present invention.

As can be seen, FIG. 2 illustrates a system comprising a cooler/refrigerator with the embarked electronics. In this case, an electronic thermostat 25 is integrated into the cooling system 20 and supplies a reference signal for the processing unit 22. The processing unit 22, in turn, controls the linear compressor 100, receiving a signal from the sensor SS corresponding to the displacement of the piston 1.

Electronic Controls

Figure 3:
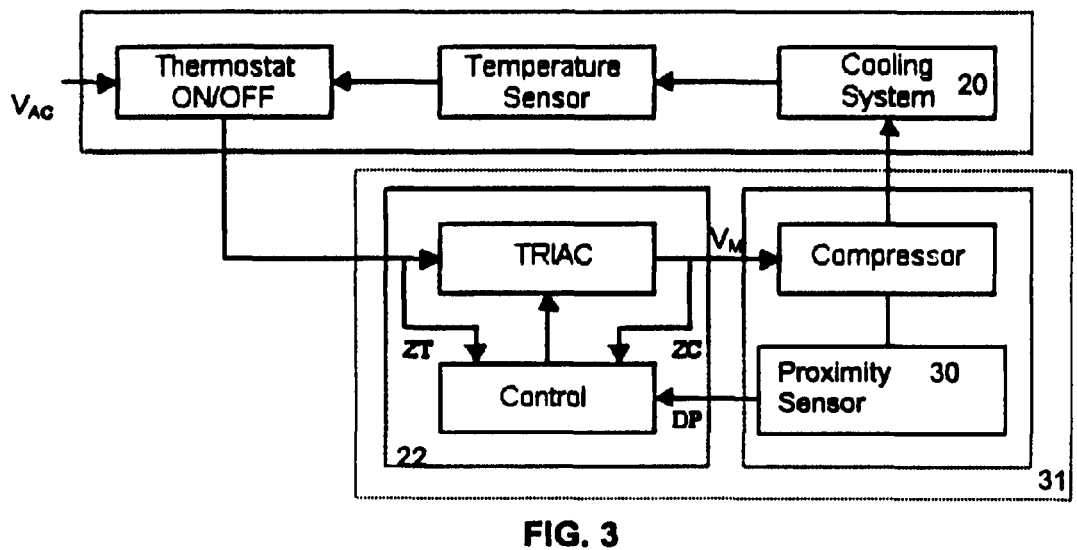
FIG. 3 is a block diagram of the control system, the linear compressor and the cooling system, illustrating the use with a conventional thermostat.

FIG. 3 illustrates a cooling system 20 applied to a simple-class cooler. As can be seen, in this case, the cooling system 20 supplies only a signal that turn the processing unit 22 on and off. In this way, the cooling system 20 can dispense all the electronics foreseen in the coolers/cooling systems that comprise embarked electronics. Moreover, with this construction the processing unit 22 can be integrated to the linear compressor 100 (see indication 31), which may be supplied for various coolers/refrigerator/cooling systems 20 manufacturers, resulting in an equipment with high flexibility when compared with pieces of equipment of the prior art. A proximity sensor 30 associated to the processing unit 22 will provide the position of the piston 1 when the latter comes close to the respective stroke end. In practice, minor variations in the piston stroke correspond to great variations in the capacity of the linear compressor, so that, by way of example, for a maximum stroke of 8.5 mm (maximum capacity) the minimum stroke would be about 6.5 mm (capacity close to zero), that is, about 2 mm of stroke variation range for the capacity to vary from zero to the maximum.

Figure 4:
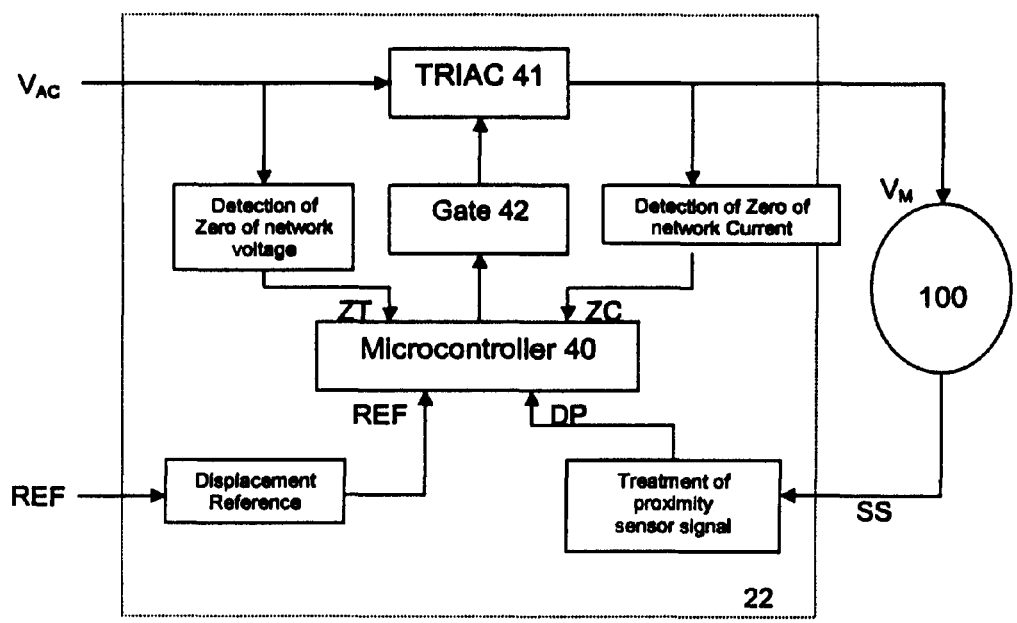
FIG. 4 is a block diagram of the control system of the present invention.

FIG. 4 illustrates a detail of the processing unit 22. As can be seen, the processing unit 22 comprises a microcontroller 40, which controls a TRIAC 41 through a gate 42. The microcontroller 40 receives the signals of detection of zero of the network $V_{AC}$ voltage ZT, as well as the zero signal of the current ZC at the exit of the TRIAC 41. A displacement reference signal REF may be supplied by the cooler, if a cooler with embarked electronics is used. The main signal for the present invention refers to the displacement signal DP, which is obtained from the signal SS of the proximity sensor 30 and that should be treated, for instance, according to the teachings of Brazilian patent document PI 0301969-1, the description of which is incorporated herein by reference. Optionally, one may use the value of the feed current $i_A$ at a moment different from ZC; for this purpose, one should make the necessary adjustments in order to have the correct measurements.

Control Algorithm

Figure 5:
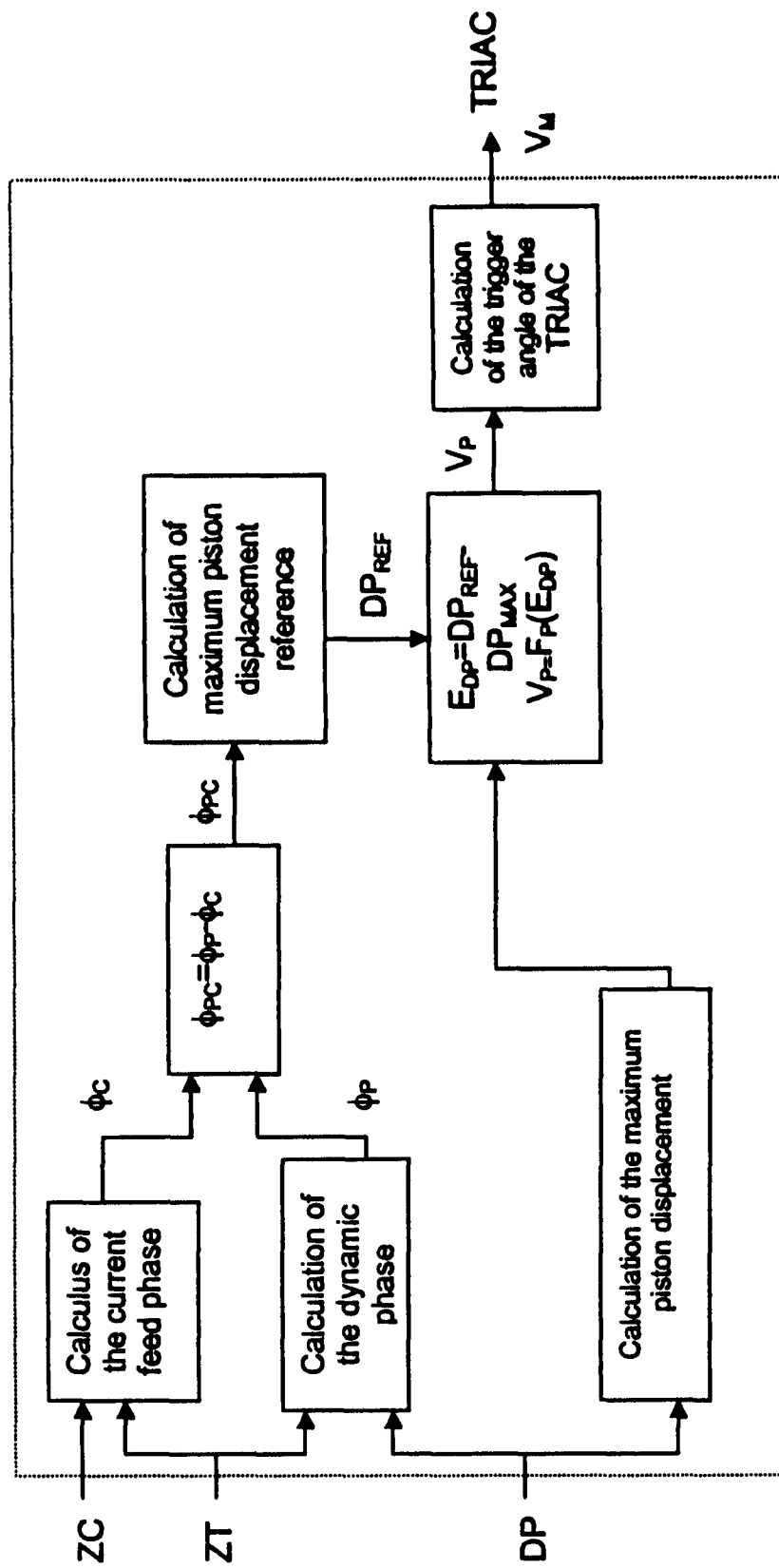
FIG. 5 is a block diagram of the algorithm of automatic control of the capacity applicable to the linear compressor and the cooling system of the present invention.

FIG. 5 illustrates the algorithm according to a first embodiment of the present invention for obtaining the controlled voltage $V_M$ that should be applied to the linear motor 10, so that one can keep the linear compressor 100 in resonance. As can be seen, in order to calculate the value of the controlled voltage $V_M$, it is necessary to calculate a measured phase $\phi_{PC}$, which is obtained from the difference between the dynamic phase $\phi_P$ and the current feed phase $\phi_C$:

$$\phi_{PC}=\phi_P-\phi_C$$

The calculation of the current phase or feed phase $\phi_C$ is made from the zero of the current ZC and from the zero voltage zero ZT, whereas the calculation of the piston-displacement phase or dynamic phase $\phi_P$ is made from the piston-displacement signal DP and from the zero of the voltage ZT.

Further with respect to the obtention of the feed phase $\phi_C$, the feed current $i_A$ may not have a passage by zero, which would make it possible to capture a pre-defined moment for establishing the zero of the current ZC. This may be observed, for instance, in FIGS. 8, 9 and 10, where the feed current $i_A$ remains at zero for a certain period. In this case, one should consider the pre-defined moment as the average point of permanence of the feed current $i_A$ at zero.

From the values of the dynamic phase $\phi_P$ and the feed phase $\phi_C$, one can obtain the value of the measured phase $\phi_{PC}$ and obtain the reference value of the maximum piston displacement $DP_{REF}$ (displacement that one expects to achieve a defined physical position). This value may be obtained by means of the algorithm of FIG. 11.

Once the reference value of maximum piston displacement $DP_{REF}$ has been obtained, it is sufficient to subtract from it the maximum piston displacement $DP_{MAX}$ by the equation:

$$E_{DP}=DP_{REF}-DP_{MAX}$$

to obtain the error value $E_{DP}$ between reference maximum piston displacement $DP_{REF}$ and the maximum of piston displacement $DP_{MAX}$.

From this result it is possible to obtain the value of a control voltage $V_P$, since its value is a function of the error $E_{DP}$. This relationship may be observed in the flow diagram in FIG. 11. Therein one may change increasing capacity with increasing $DP_{REF}$, and may change decreasing capacity with decreasing $DP_{REF}$. Alternatively, one may also use, for instance, a traditional method such as a PID algorithm to alter $DP_{REF}$; in this case, the calculation would be made from the following equation:

$$DP_{REF} = K_P \times \phi_{PC} + K_D \times \left(\frac{\partial \phi_{PC}}{\partial T}\right) + K_i \times \int \phi_{PC} \times \partial T$$

wherein $K_P$ is a proportional constant, KD is a derived constant and Ki is an integral constant, as known from the classic nomenclature in control.

Further one may directly increase or decrease the value of the control voltage $V_P$, since this value if a function of $\phi_{PC}$. In this case, in the flow chart of FIG. 11, one may change increasing capacity with increasing $V_P$, and may change decreasing capacity with decreasing $V_P$, so that in this option one may also use some traditional method such as PID algorithm to alter $V_P$ from $\phi_{PC}$ by using the following equation:

$$V_P = K_P \times \phi_{PC} + K_D \times \left(\frac{\partial \phi_{PC}}{\partial t}\right) + Ki \times \int \phi_{PC} \times \partial t$$

The constants are the same as described before.

From the value of the control voltage $V_P$ it is possible to adjust the controlled voltage $V_M$ by calculating the trigger angle of the TRIAC.

Figure 6:
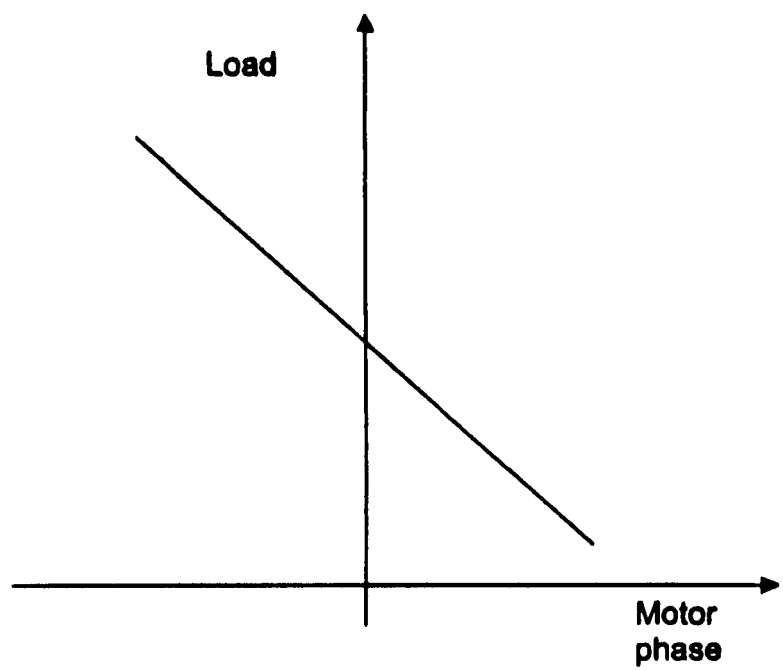
FIG. 6 represents a curve of the load of the electric motor in function of the phase.
Figure 7:
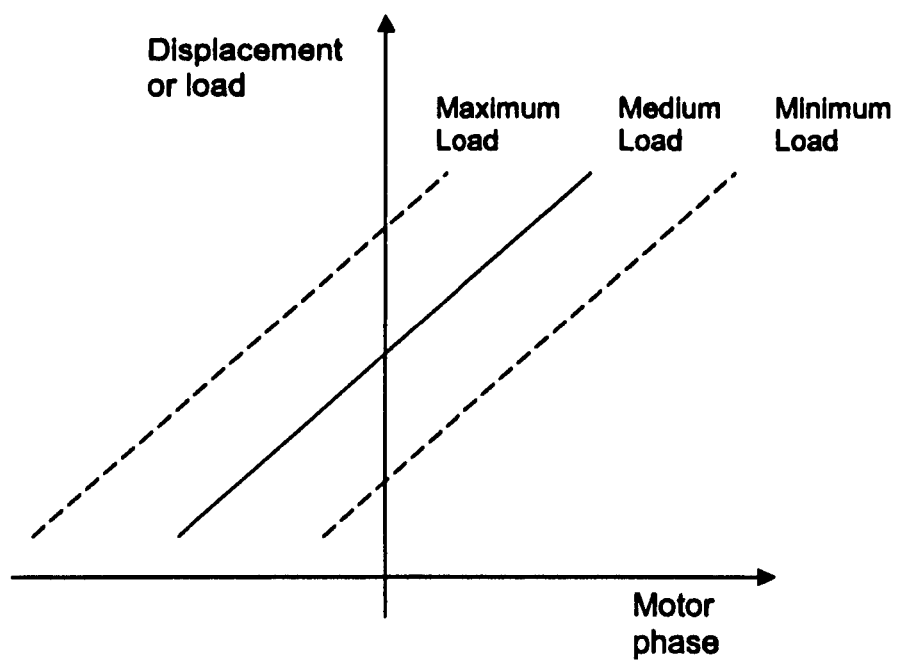
FIG. 7 represents a curve of the capacity of the electric motor in function of the phase for various loads.

According to the graph of FIGS. 6 and 7, increases in the system load (increase in room temperature, increase in the thermal load in the system) lead to a decrease in the system phase. If this increase in the load is large (see dashed line with indication of "maximum load" in FIG. 7) the phase will go on to negative values; this can be compensated by an increase in the capacity of the system (increase in the piston stroke 1), which will increase the phase, so that successive increments in the capacity lead the phase to the zero value, that is to say, the system will be operating in resonance. In an equivalent way, a decrease in the load (see dashed line with indication of "minimum load" in FIG. 7) the phase will go to positive values, and this variation can be compensated by an Increase in phase, so that successive Increments lead the value of the phase to zero, that is to say, the system will be operating in resonance.

As far as the manner of making the increase and the decrease in phase is concerned, the reading of the feed phase $\phi_C$ and the dynamic phase $\phi_P$ every cycle or semi-cycle should be foreseen. So, whenever the measured phase $\phi_{PC}$ is different from zero, the control system should actuate on the piston displacement, and the reading of the dynamic phase $\phi_{PC}$ may be made according to the teachings of Brazilian patent document PI 0300010-9, which is incorporated herein by reference.

The amplitude of the decrements should take into consideration the reaction of the system in response to the increment/decrement caused by the control system. Thus, if the value of the increment/decrement is high, a longer stabilization time will be required; in the contrary case, the stabilization time will be shorter. Typically, the stabilization time depends upon the constants of the compressor time and of the cooling system. By way of example, one may opt for awaiting a predetermined time, for instance about 10 to 60 seconds, or monitor the system phase until the latter remains constant.

Optionally, it is possible to use variable increment/decrement values. In this case, if the measured phase $\phi_{PC}$ is large, one may use larger increments/decrements, and decrease this value as the value of the measured phase $\phi_{PC}$ comes close to zero. In this case, one may opt for a reference value of 1% of increment/decrement.

Figure 8:
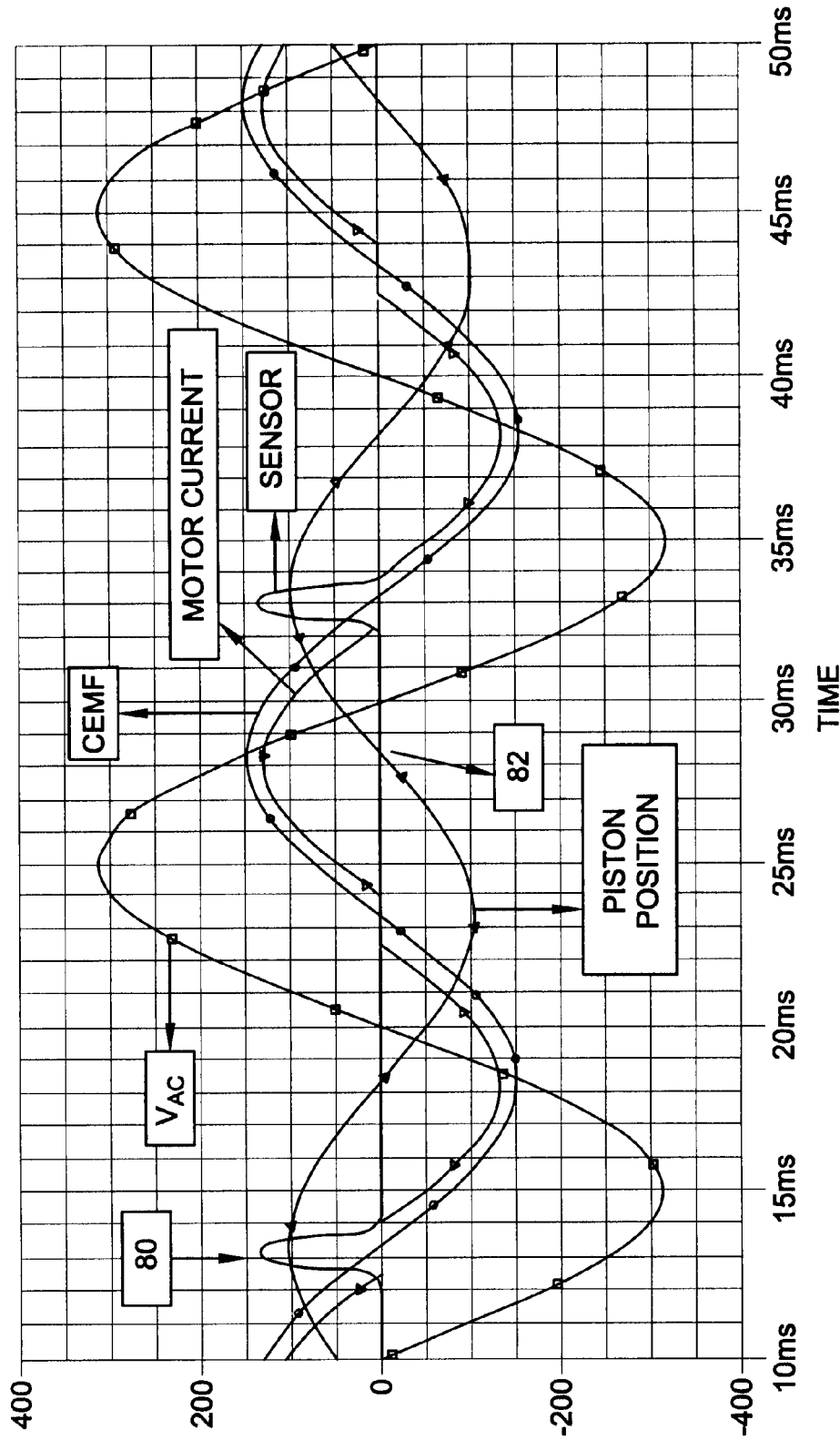
FIG. 8 is a time diagram illustrating the wave forms of the voltage network, counter-electromotive force (CEMF), current of the electric motor, position of the piston and signal of the sensor in the situation in which the linear compressor is operating at the resonance ($\phi_{PC}=\phi_P-\phi_C=0$)

FIG. 8 shows a time diagram illustrating the wave forms of voltage of the network $V_{AC}$ of the counter-electromotive force (CEMF), of the current $i_A$ of the linear motor 10, of the piston position DP and of the signal of the proximity sensor (not shown) in the situation where the linear compressor 100 is operating in resonance, that is to say, when $\phi_{PC}=\phi_P-\phi_C=0$.

As can be seen, in the situation of resonance, the piston displacement is maximum when the feed current $i_A$ of the linear motor 10 passes by zero, a moment when the proximity sensor shows a measurable signal (see indication 80). In this condition, linear compressor 100 operates in optimum condition, since in this case the feed current $i_A$ passes by zero at the moment when the piston 1 is changing direction in its path, that is to say, it passes by a moment of maximum displacement, when there is no need for application of force onto it, since when the piston 1 is at mid-displacement (see indication 82) the feed current $i_A$ and the CEMF are maximum, impelling the piston 1 in the most effective way possible.

Figure 9:
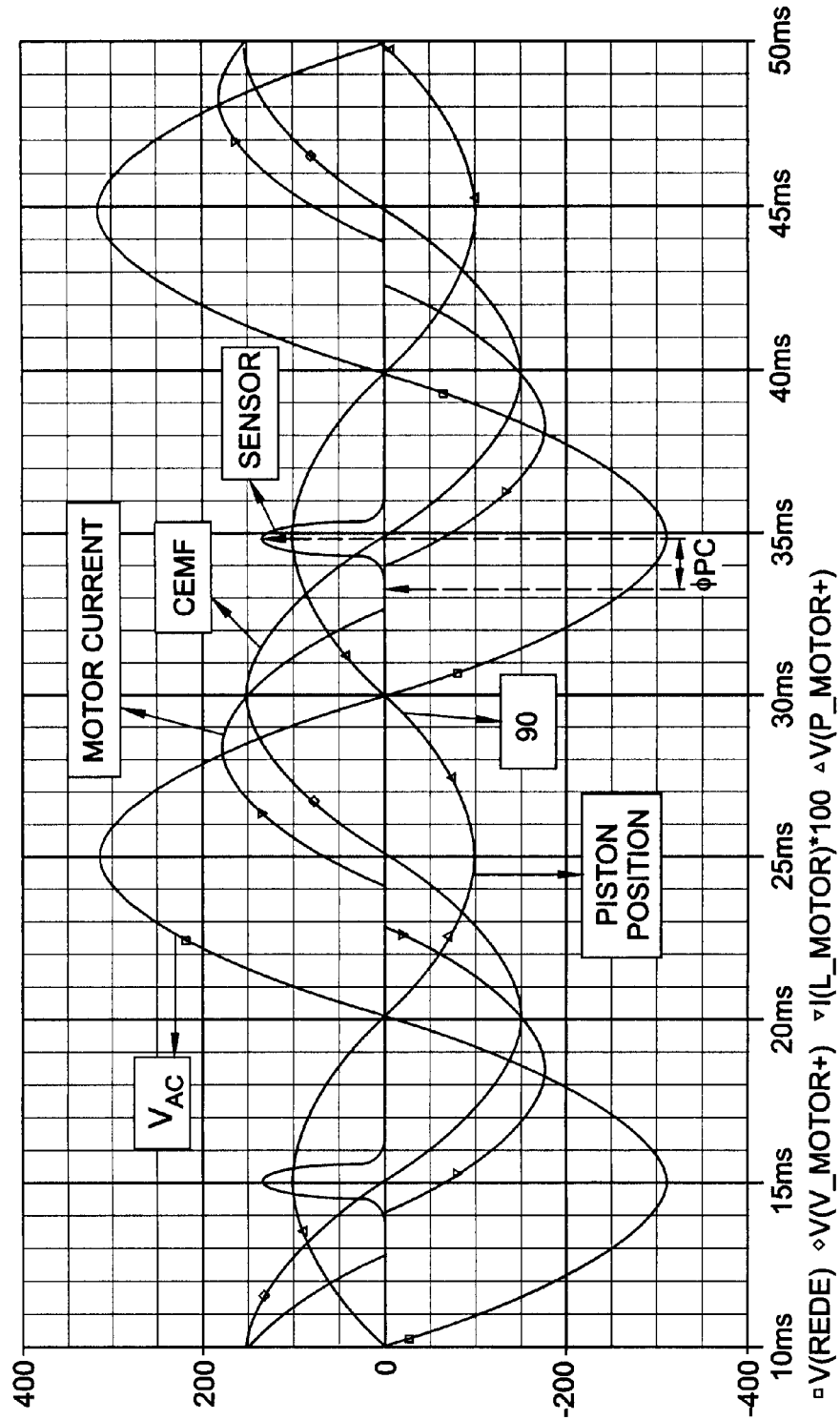
FIG. 9 is a time diagram illustrating the wave forms of the voltage network, counter-electromotive force (CEMF), current of the electric motor, position of the piston and signal of the sensor in the situation in which the linear compressor is operating above the resonance ($\phi_{PC}=\phi_P-\phi_C>0$)

In FIG. 9 one can observe that the linear compressor 100 is operating above the resonance, that is to say, the CEMF is in delay with respect to the feed current $i_A$ of the linear motor 10. In this case, the equation is $\phi_{PC}=\phi_P-\phi_C>0$, and one should increment the capacity of the linear compressor 100 by raising the controlled voltage $V_M$. It can be noted that, in this situation, when the piston 1 is at maximum displacement of its path, a moment when no feed current $i_A$ should be applied to the linear motor 10, the feed current $i_A$ already has a significant value at this moment. According to the same situation of phase shift, at the moment when the piston 1 is at the middle of its path (see indication 90), a moment when the maximum feed current $i_A$ should be applied to the linear motor 10, the feed current $i_A$ has already undergone a decrease in its level, so that in the two situations there is a waste of energy and, therefore, a reduced efficiency in the operation of the linear compressor 100 as a whole.

Figure 10:
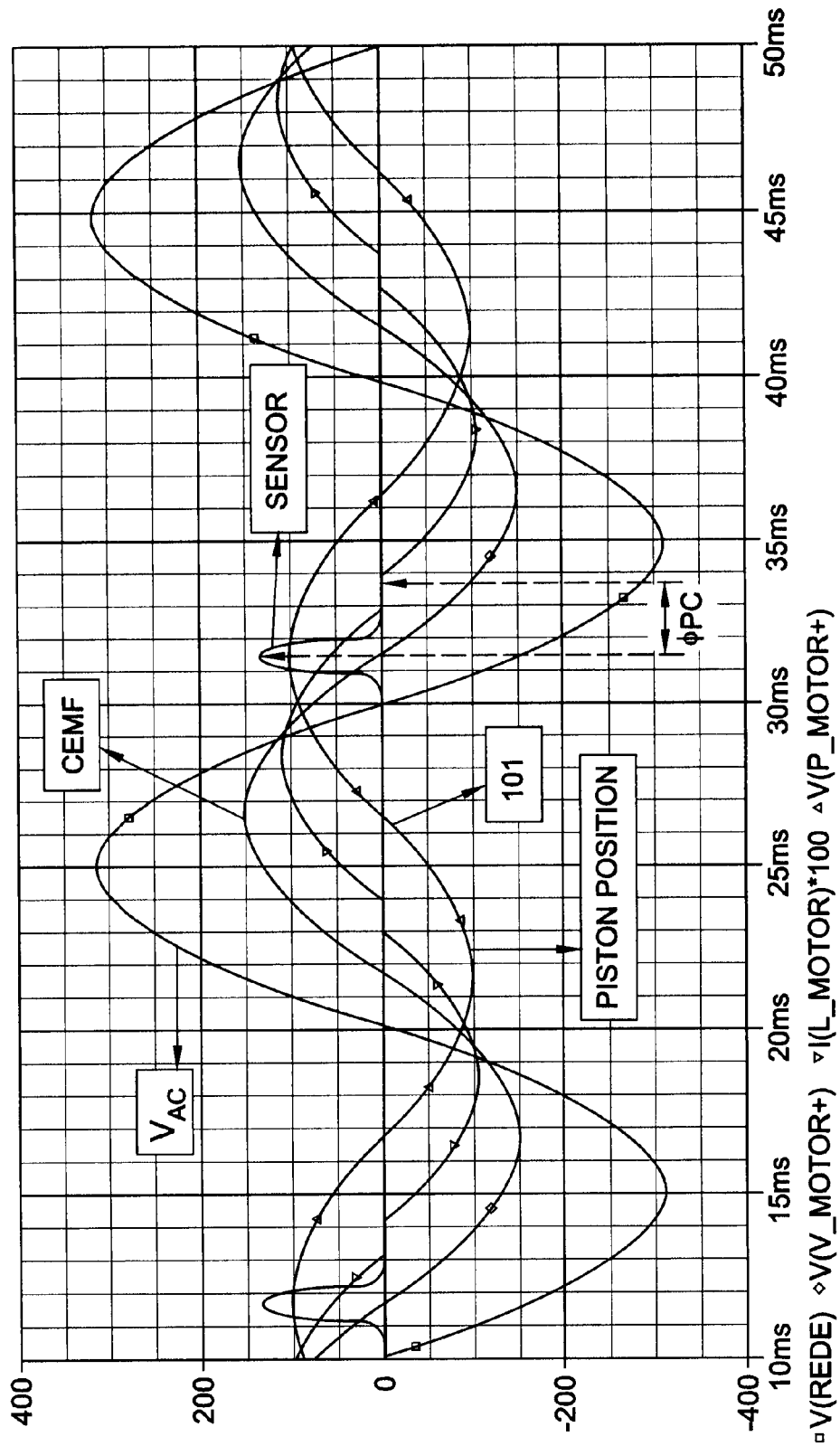
FIG. 10 is a time diagram illustrating the wave forms of the network voltage, counter-electromotive force (CEMF), current of the electric motor, position of the piston and signal of the sensor in the situation in which the linear compressor is operating below the resonance ($\phi_{PC}=\phi_P-\phi_C<0$)

In FIG. 10 one can observe that the linear compressor is operating below the resonance; in this case the CEMF is advanced with respect to the feed current $i_A$ of the linear motor 10, and the equation is then $\phi_{PC}=\phi_P-\phi_C<0$. In this case, one should increment the capacity of the linear compressor 100, to have the system operating in resonance.

As can be seen, in this situation there is a delay in the phases, which causes the linear compressor to operate with low efficacy, since at the moment when the piston displacement is maximum, a situation on which no feed current $i_A$ should be applied to the linear motor 10, one can observe that the feed current $i_A$ is not null. Moreover, at the moment when the piston 1 is at the middle of the displacement (see indication 101), a moment when a maximum of feed current $i_A$ should be applied to the linear motor 10, the feed current $i_A$ is not maximum, so that, in this case too, the linear compressor 100 has its efficiency reduced.

Application in Linear Compressors

Structurally, the linear compressor 100 and the system of controlling a linear compressor 100 have the following characteristics:

The linear compressor 100 comprises a piston 1 and is driven by the linear motor 10, which brings about a displacement range that will be controlled through the controlled voltage $V_M$, this controlled voltage $V_M$ having a voltage frequency $f_p$. The range of piston 1 displacement is dynamically controlled as a function of the variable demand of the cooling system 20, through the processing unit 22, which adjusts the range of piston displacement, so that the linear compressor 100 will be dynamically kept in resonance throughout the variations in demand of the cooling system 20, that is to say, so that its displacement range will be adjusted throughout the changes resulting from the variations in load demanded by the cooling system 20, impelling the linear compressor to operate in resonance. The system of controlling the linear compressor 100, when taken in isolation, should be applicable to the linear compressor so as to make the dynamic adjustment of the displacement range, to have the linear compressor operating in resonance.

Application in Cooling Systems

The cooling system 20, which may include a cooler/refrigerator or an air-conditioning system and analogous systems, as already commented, should comprise an on/off thermostat actuated by the linear compressor 100, to have the range of piston displacement dynamically controlled as a function of the variable demand of the cooling system 20 during the period when the thermostat turns on the linear compressor. The processing unit 22 should dynamically adjust the range of piston displacement, so to keep the linear compressor in resonance throughout the variations of demand of the cooling system 20.

Figure 11:
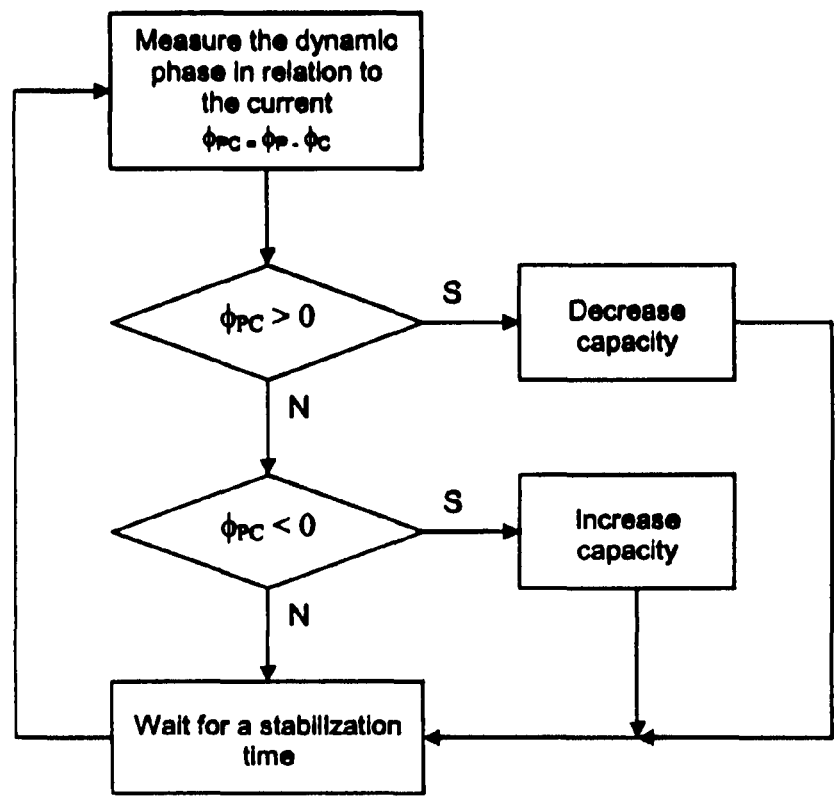
FIG. 11 is a flow diagram of the method for controlling the linear compressor of the present invention.

In order to control the linear compressor 100, the control system and the cooling system 20 of the present invention are provided with a method of controlling the linear compressor 100 that follows the flow chart illustrated in FIG. 11.

The control over the range of piston 1 displacement is made by means of a controlled voltage $V_M$, which is adjusted by the processing unit 22. In order to adjust the level of the controlled voltage $V_M$, one may opt for following the teachings of a brazilin patent document PI 9907432-0, which is incorporated herein by reference.

Application in Linear Motors

Bearing in mind that, with a control usable on linear compressors in general, one can make use of the teachings of the present invention on a linear motor 10 applied to other types of utilization. In this case, an actuator (not shown) has the same function of the piston 1 used in the compressor 100, that is to say, the actuator receives the force generated at the stator 411, moving the load and forming a resonant assembly that will have a resonance frequency.

In an analogous way as foreseen for the control over the linear compressor 100, the actuator has a displacement range that will be controlled by means of the controlled voltage $V_M$ from the processing unit 22, so that the resonant assembly will be dynamically kept in resonance throughout the variations of load.

The control over the linear motor 10 may also be made by means of the processing unit 22, which measures the feed phase $\phi_C$ of the feed current $i_A$ and of the dynamic phase $\phi_P$, in this case of the actuator rather than of the piston, and adjusts the controlled voltage $V_M$, so that the value of the measured phase $\phi_{PC}$ will be null.

Also, one may control the linear motor 10 by using a variable frequency inverter, which should be dynamically adjusted to the voltage frequency $f_{VM}$ of the controlled voltage $V_M$ to a value equal to the value of the resonance frequency of the resonant assembly, as the load variations occur.

Control Method by Phase Adjustment

In order to carry out the control method, the processing unit 22 monitors the range of piston 1 displacement throughout the operation of the linear compressor 100 and dynamically adjusts the displacement range as a function of a variation in demand of the linear compressor 100, so that the linear compressor 100 will be kept in resonance throughout the variations in demand of the cooling system 20.

In order to impel the linear compressor 100 to operate in resonance, one measures the feed phase $\phi_C$ of a feed current $i_A$ and the dynamic phase $\phi_P$ of the piston 1 of the linear compressor 100 and measures the difference between the measured phases to establish the measured phase $\phi_{PC}$.

After the step of establishing the measured phase $\phi_{PC}$, one should increment the range of piston 1 displacement when the value of the measured phase $\phi_{PC}$ is positive or a step of decreasing the range of piston 1 displacement when the value of the measured phase $\phi_{PC}$ is negative, and one should always increase or decrease the displacement of the piston 1 to a value necessary for the measured phase $\phi_{PC}$ to be null.

By preference, after the step of increasing or decreasing the range of piston 1 displacement, one should wait until a stabilization time has passed before measuring again the difference between the feed phase $\phi_C$ and the dynamic phase $\phi_P$.

Control Method by Adjustment of Phase Frequency

According to a second preferred embodiment of the present invention, another way of controlling the compressor to control the frequency applied to the motor to keep it will always operating in resonance.

In this case, the control is made through the variable frequency, by using a variable frequency inverter (not shown). In this way, when the load applied to the linear compressor 100 is changed, there will also be a change on the dynamic phase $\phi_P$ of the system, which will be detected by the control system of the present invention, in order to alter the frequency for the compressor to operate in resonance. This control is dynamically made by adjusting the voltage frequency $f_{VP}$, through the variable frequency inverter, to a value equal to the resonance frequency of the linear compressor 100, as the variations in demand of the cooling system 20 occur.

The ways of making this kind of adjustment may include, for example, varying the frequency so as to minimize the feed current or else varying the frequency so as to zero the phase between current and the CEMF.

Figure 12:
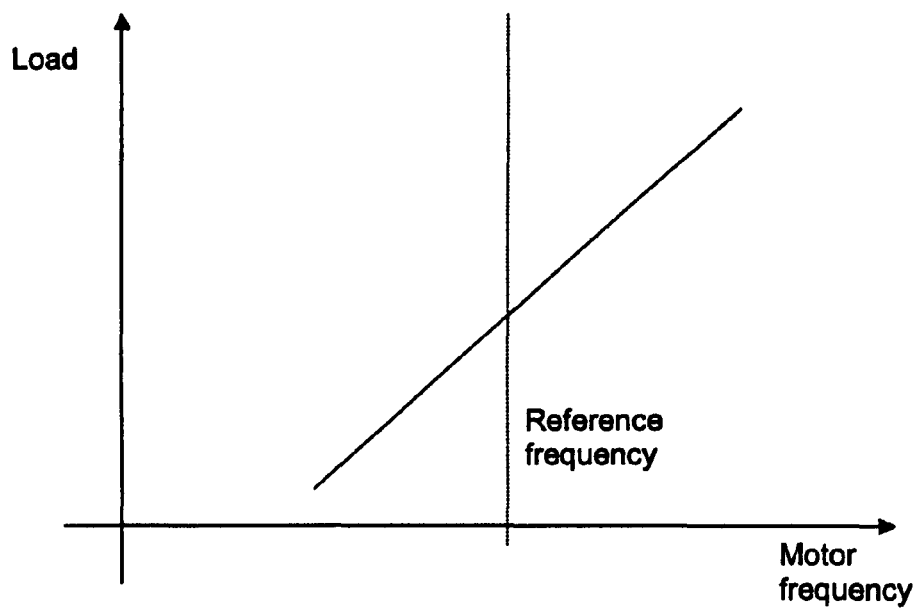
FIG. 12 represents a curve of the load of the electric motor in function of the phase, when the teachings of the present invention are employed, according to a second preferred embodiment.
Figure 13:
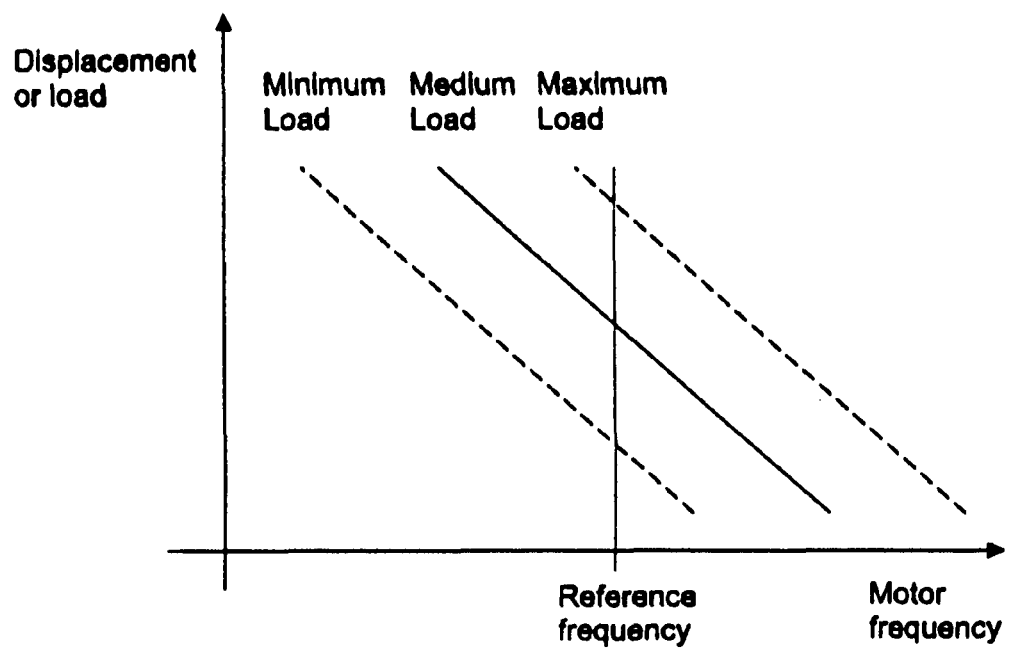
FIG. 13 represents a curve of the capacity of the electric motor in function of the phase for various loads when the teachings of the present invention are employed, according to a second preferred embodiment.

As can be seen in FIGS. 12 and 13, when the load increases, the frequency of the linear compressor 100 increases, and one should increment the respective capacity, to have the system operating in resonance and vice-versa, when the load decreases, that is to say, the system should increase the piston 1 stroke/capacity/compressor 100 and, when the frequency decreases, the control system should decrease the stroke/capacity. In the same way as in the first preferred embodiment of the present invention, it is possible to operate the cooling system by means of a simple "On/Off"-type thermostat, maintaining the same concept of adjustment of the piston 1 (capacity of the compressor 100) by varying the frequency.

In this regard, one can observe that the basic concept between the first preferred embodiment of the present invention and the second embodiment is similar, that is to say, one can observe the effect of the change in the load applied to the compressor with respect to the resonance frequency, and, with this information, alter the piston stroke (compressor capacity).

Figure 14:
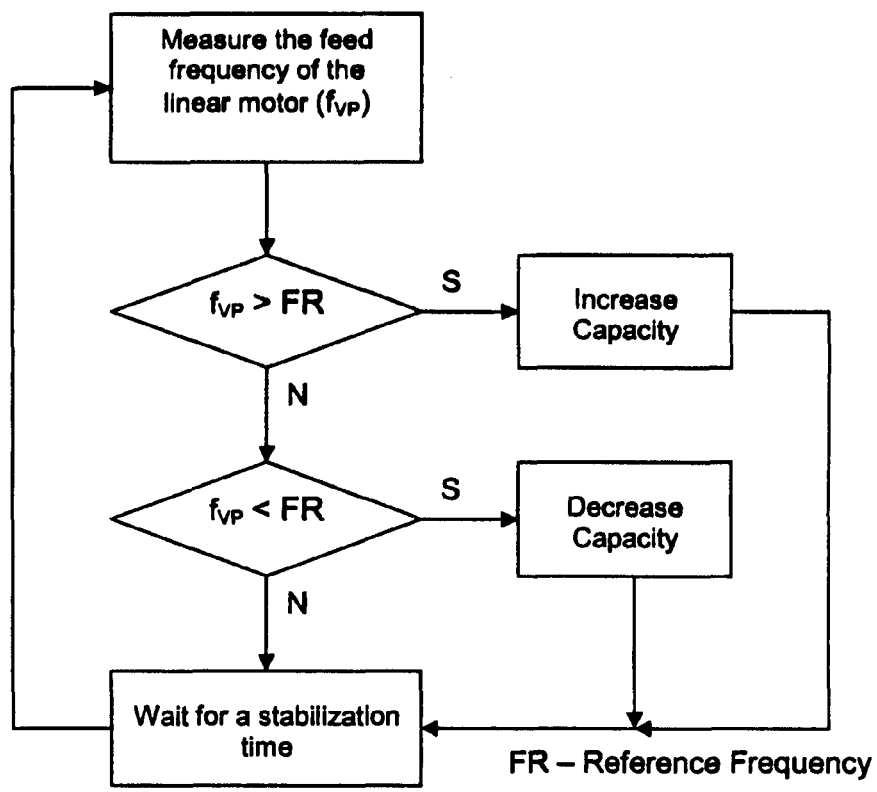
FIG. 14 represents a flow diagram of the method for controlling the linear compressor, according to a second embodiment of the present invention.

With the control method in this embodiment, one can proceed in accordance with the flow diagram shown in FIG. 14 and following these steps:

measuring the feed frequency of the linear motor 10, which is the voltage frequency $f_{VP}$, and then making the compensation of this measurement with the value of a reference frequency FR, which is usually of 50 or 60 Hz.

In this compensation step, if the voltage frequency $f_{VP}$ is higher than the reference frequency FR, one should increment the capacity of the linear compressor 100. If the voltage frequency $f_{VP}$ is lower than the reference frequency FR, one should decrease the capacity of the linear compressor 100.

To have these methods of the first and second embodiment operating in the best possible condition for the system, the linear compressor 100 has to be designed to operate in resonance when the system is stabilized and at low capacity (in this condition, the system should operate 80% of the time). In this way, when a greater capacity is necessary, the algorithm will increase the capacity of the linear compressor 100.

Another ability which the algorithm should have is the function of maximum (rapid) freezing. In a freezer, when this function is active, the linear compressor 100 will function for 24 hours without cycling; in systems with variable capacity, the linear compressor should function at the maximum capacity, regardless of the load or internal temperature. In order to perform this function, the algorithm may measure the cycle time, if this time is longer than a reference (for instance, 2 hours); the algorithm will go to the maximum capacity independently of the phase condition and will only operate normally again when the system cycles or when the 24 hours have passed.

The advantages of the proposed solution are as follows:
- it enables one to apply the linear compressor in simple systems, equipped with conventional thermostat and to use the advantages of the variable capacity;
- it reduces costs of the cooling/refrigerator system 20;
- it optimizes the functioning of the linear compressor (the linear compressor always works at the maximum efficiency);
- the performance of the linear compressor is improved;
- there is a correction in the pumping capacity of the linear compressor, adapted to the need of the cooling system 20.

Examples of preferred embodiments having been described, one should understand that the scope of the present invention embraces other possible variations, being limited only by the contents of the accompanying claims, which include the possible equivalents.

The invention claimed is:

1. A method of controlling a linear compressor (100) of a cooling system (20), the linear compressor (100) comprising a piston (1) driven by a linear motor (10),
the piston (1) having a controlled voltage ($V_M$), the controlled voltage ($V_M$) having a voltage frequency ($f_{VM}$) applied to the linear motor (10) and adjusted by a processing unit (22),
the controlled voltage ($V_M$) generating a feed current ($i_A$) that circulates in the linear motor (10),
wherein the method comprises the steps of:
measuring a feed phase ($\phi_C$) of the feed current ($i_A$) and a dynamic phase ($\phi_P$) of the piston (1) of the linear compressor (100),
measuring a difference between the feed phase ($\phi_C$) and the dynamic phase ($\phi_P$) and establishing a measured phase ($\phi_{PC}$),
dynamically adjusting a range of displacement of said piston as a function of a variation in demand of the linear compressor (100) of the cooling system, so that the linear compressor will be kept in resonance throughout the variation in demand so that a value of the measured phase ($\phi_{PC}$) will be null, wherein said variation in demand is derived from changes in said measured phase ($\phi_{PC}$) without reference to an external variable.

2. A method according to claim 1, wherein, after the step of establishing the measured phase ($\phi_{PC}$), further comprising a step of increasing the range of piston (1) displacement when the value of the measured phase ($\phi_{PC}$) is positive or a step of decreasing the range of piston (1) displacement when the value of the measured phase ($\phi_{PC}$) is negative.

3. A method according to claim 2, wherein said method further comprises, after the step of increasing or decreasing the range of piston (1) displacement, waiting for the passage of a stabilization time.

4. A method according to claim 3, wherein, after the passage of the stabilization time, said method further comprises a new measurement of the difference between the feed phase ($\phi_C$) and the dynamic phase ($\phi_P$).

* * * * *